UNITED STATES PATENT OFFICE.

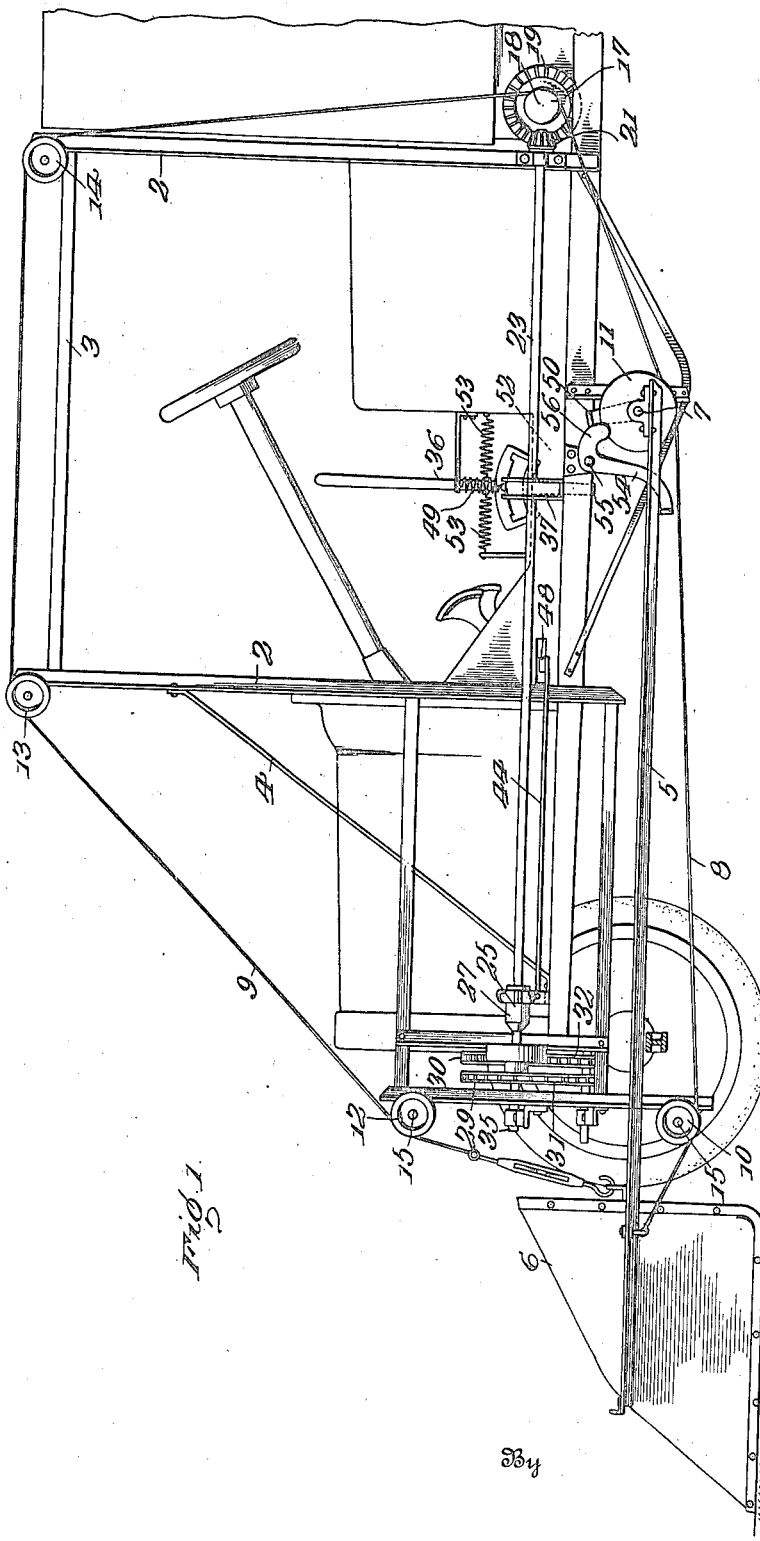

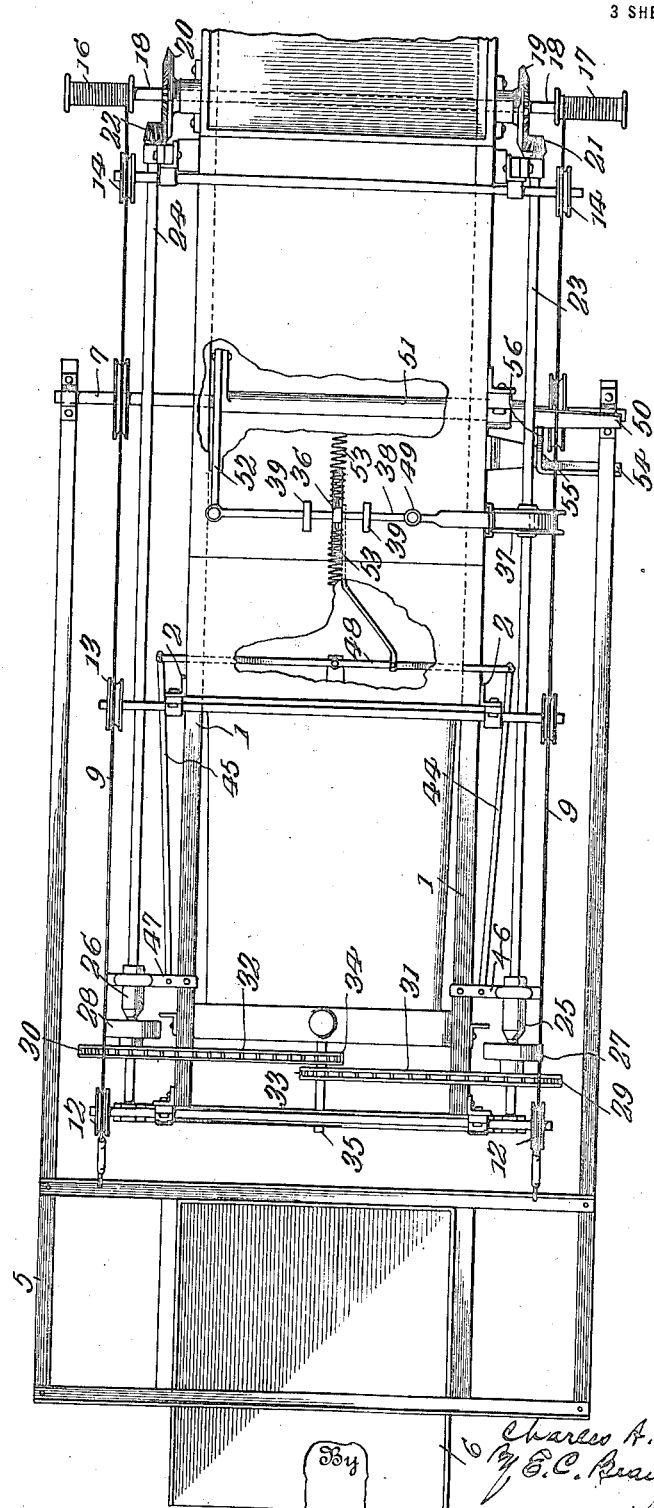

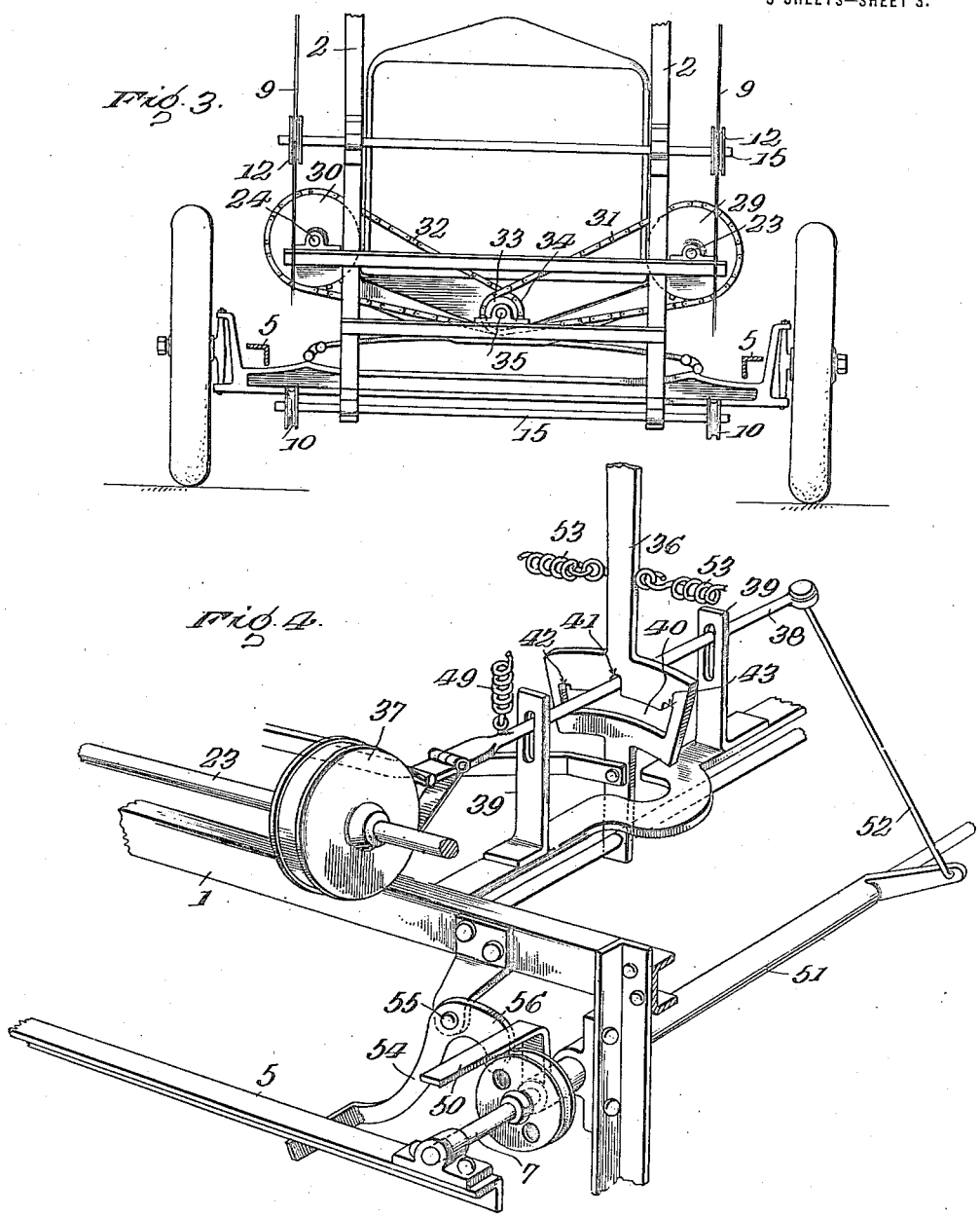

CHARLES A. BLANK, OF MILLER, INDIANA.

AUTO POWER-SCOOP.

1,301,643.    Specification of Letters Patent.    Patented Apr. 22, 1919.

Application filed March 15, 1918. Serial No. 222,726.

*To all whom it may concern:*

Be it known that I, CHARLES A. BLANK, a citizen of the United States of America, residing at Miller, in the county of Lake and State of Indiana, have invented certain new and useful Improvements in Auto Power-Scoops, of which the following is a specification.

My invention relates to an improvement in auto power scoops, and the object is to provide an attachment for automobiles, adapted for scooping and loading or sifting dirt, hay, manure, coal, snow or other material either from in front of, or in rear of the machine, accordingly as the latter is equipped, and as the occasion requires.

One of the objects is to provide power means for both raising and lowering the scoop, all of which may be done by the use of one or more cables or equivalent means connected with the scoop and other self-contained mechanism carried by the auto for its control.

In the accompanying drawings:—

Figure 1 is a view in side elevation;

Fig. 2 is a plan view;

Fig. 3 is a front view;

Fig. 4 is a fragmentary perspective view of the controlling mechanism.

The numeral 1 represents the auto frame, and 2 the superstructure supported thereon, and consisting of uprights with suitable cross-beams 3 and braces 4. The numeral 5 represents the scoop frame. This also comprises longitudinal and cross-bars with braces secured together, as shown in Fig. 2. The scoop 6, or its equivalent, is carried at the forward end of this frame, as shown in Figs. 1 and 2, and the rear end is supported on the outer ends of a cross-shaft 7, carried beneath the frame of the machine, from which the scoop frame and scoop is supported and swings as it is raised and lowered. Cables 8 and 9 are secured at their forward ends to the forward end of the scoop-frame,— as shown in Fig. 1, cable 8 extending under pulleys 10 and 11, and cable 9 over pulleys 12, 13 and 14 on the outer ends of shafts 15 secured to the frame and superstructure, and finally to the spools 16 and 17, shown in Fig. 2, upon which they are wound and unwound, one pair of cables 8 being wound while the pair 9 are unwound, and vice versa. Just in this connection it may be stated that instead of four cables for this purpose, it is perfectly obvious that two could be made to serve the purpose by locating them at or near the longitudinal center of the machine, instead of at the sides.

The spools 16 and 17 are mounted on a shaft 18, and this shaft is provided with bevel-gears 19 and 20 which mesh with bevel-pinions 21 and 22 on the rear ends of the shafts 23 and 24, and these shafts 23 and 24 are driven by clutches 25 and 26, slidably keyed at their forward ends, which are adapted to be slid in and out of connection with the clutch sections 27 and 28. These sections have sprocket-wheels 29 and 30 thereon from which sprocket-chains 31 and 32 extend to the sprocket-wheels 33 and 34 on the centrally-located main power shaft 35 which is driven by the motor (not shown).

These clutches, as well as the brake of the machine, are operated and controlled from a centrally-located lever 36, shown in detail in Fig. 4. A brake-drum 37 is secured on the shaft 23, and the brake-lever 38 extends through the slots in the lever-guides 39, as shown in Fig. 4, and also through the slot 40 in the operating-lever 36. This operating-lever has three notches, namely a central notch 41 and end-notches 42 and 43, and when in its central position the brake-lever is in the central notch 41, thereby causing the brake to be applied, the brake-lever extending in position, however, where the operator may control it by his foot.

The operating shaft 23 is indirectly connected with the two clutches 25 and 26 by means of the connecting rods 44 and 45 which are connected at their forward ends to clutch shifting members 46 and 47 and at their rear ends by a pivoted bar 48. Assuming the scoop to be in its lowered position, the operator drives the machine forward into the material to be loaded until the scoop is filled, after which the operator will first place his foot on the brake-lever 38 causing it to recede from the central notch 41 whereupon the operator will move the hand-lever 36, forward, after which he removes his foot from the brake lever which latter locks in the rear notch 43. This notch 43, however, is not of sufficient depth to permit the brake-lever 38 to be drawn up by the spring 49 to such a height as to apply the brake, the lever in this instance merely acting as a lock to hold the hand lever 36 in its forward position. With the forward movement of the hand-lever 36, the clutch 25 is thrown into operation and the clutch 26 is released and the scoop comes up or raises itself full distance. When the bar 5 of the scoop frame engages a member 50 thereby rocking the hollow shaft 51 causing the connecting link 52 connected to the outer end thereof and the brake-lever 38 to draw the brake lever 38 downwardly a sufficient distance to release the hand lever 36 whereupon the springs 53—53 automatically return the hand lever 36 to its vertical or neutral position whereupon the brake lever 38 again registers with the slot 41 thereby automatically setting the brake.

In lowering the scoop the operator will again press down with his foot on the brake lever 38 and release the hand lever whereupon it will be pulled rearwardly and the notch 42 engaged by the lever and held in that position, this movement causing a reversal of the clutches 25 and 26 and the latter being thrown in position causing the drums 16 and 17 to rewind and return the scoop to its lowered position, whereupon the member 54 which is pivoted to the main frame as at 55 is actuated, the lower end 56 thereof engaging the member 50, thereby causing the brake-lever 38 to be withdrawn from the notch 42 whereupon the hand-lever will again assume neutral or vertical position and the brake again set.

It will be understood that my invention contemplates the use of various sizes and shapes of scoops, as well as the provision of a below-grade depth and suitable for ditching and excavating. Likewise it is my purpose to substitute for the scoop various styles of forks for handling hay, manure, and other material. Also I contemplate the removal of the scoop and the adjustment, in lieu thereof, of any form of hook or tongs, whereby to use the scoop as a crane for lifting materials and objects.

In like manner, I desire it understood that the scoop may be located on the rear end of the machine when desirable, and of especial advantage as well in front, in which event it would be necessary to back the machine to fill the scoop, and it would then be my intention to attach instead of a scoop any kind of platform which would elevate the material placed thereon to a level with the truck floor.

The scoop might have a solid or hinged back to be automatically unlocked by means of a trip, which would be actuated by striking any solid surface when at a point to discharge its contents, as is well understood.

I claim:

1. An auto power scoop comprising a frame and superstructure carrying anti-friction and power mechanism, a pivotally mounted scoop frame and scoop, means connected with the scoop and power mechanism for positively raising and lowering said scoop, means within the control of the operator for causing the scoop to be raised and lowered, and means actuated by the scoop frame for disengaging the power mechanism from the scoop raising and lowering mechanism at a predetermined position.

2. An auto power scoop comprising a frame and superstructure carrying anti-friction and power mechanism, a pivotally mounted scoop frame and scoop, means connected with the scoop and power mechanism for positively raising and lowering said scoop, means within the control of the operator for causing the scoop to be raised and lowered, and means actuated by the scoop frame for disengaging the power mechanism from the scoop raising and lowering mechanism and applying a brake thereto when in its extreme upper and lower positions.

3. An auto power scoop comprising a frame and superstructure carrying anti-friction and power mechanism, a pivotally-mounted scoop frame and scoop, a cable carried over the anti-friction mechanism, a winding and unwinding drum therefor, transmission mechanism for rotating the drum, means within the control of the operator for regulating the rotation of the drums, and means actuated by the pivotally mounted scoop frame for automatically disengaging the transmission mechanism from the drum at predetermined positions.

4. An auto power scoop comprising a frame and superstructure carrying anti-friction and power mechanism, a pivotally-mounted scoop frame and scoop, a cable carried over the anti-friction mechanism, a winding and unwinding drum therefor, transmission mechanism for rotating the drum, means within the control of the operator for regulating the rotation of the drums, and means actuated by the pivotally mounted scoop frame for automatically disengaging the transmission mechanism from the drum and applying a brake thereto when in its extreme upper and lower positions.

5. An auto power scoop comprising a frame and superstructure carrying anti-friction and power mechanism, a pivotally-mounted scoop frame and scoop, a cable carried over the anti-friction mechanism, a winding and unwinding drum therefor, clutch mechanism arranged between the drum and the power mechanism for driving the drum in either direction, means within the control of the operator for shifting the clutch mechanism for raising and lowering the scoop, and means actuated by the scoop frame for automatically disengaging the clutch from the power mechanism at predetermined intervals.

6. An auto power scoop comprising a frame and superstructure carrying anti-friction and power mechanism, a pivotally mounted scoop frame and scoop, parallel cables carried over the anti-friction mechanism, companion drums therefor, independent driving mechanism interposed between the drums and power mechanism, clutches therefor, and actuating mechanism for simultaneously shifting the clutches in opposite directions whereby the drums are alternately rotated in opposite directions, and the scoop frame raised and lowered.

7. An auto power scoop comprising a frame and superstructure carrying anti-friction and power mechanism, a pivotally mounted scoop frame and scoop, parallel cables carried over the anti-friction mechanism, companion drums therefor, independent driving mechanism interposed between the drums and power mechanism, clutches therefor, actuating mechanism for simultaneously shifting the clutches in opposite directions whereby the drums are alternately rotated in opposite directions, and the scoop frame raised and lowered, and means actuated by the scoop frame for disengaging the clutches from the power mechanism when the scoop is in either extreme position.

In testimony whereof I affix my signature.

CHARLES A. BLANK.